(12) United States Patent
Chou et al.

(10) Patent No.: US 11,076,139 B2
(45) Date of Patent: Jul. 27, 2021

(54) COLOR RECONSTRUCTION DEVICE AND METHOD (71) Applicant: REALTEK SEMICONDUCTOR CORPORATION, Hsinchu (TW)

(72) Inventors: Yang-Ting Chou, Tainan (TW); Tsung-Hsuan Li, Taichung (TW); Shang-Lun Chan, Hsinchu (TW); Shih-Tse Chen, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 116 days.

(21) Appl. No.: 16/502,481

(22) Filed: Jul. 3, 2019

(65) Prior Publication Data
US 2020/0059634 A1 Feb. 20, 2020

(30) Foreign Application Priority Data
Aug. 16, 2018 (TW) .................................. 107128609

(51) Int. Cl.
H04N 9/64 (2006.01)
G06T 7/40 (2017.01)
(Continued)

(52) U.S. Cl.
CPC ............. H04N 9/646 (2013.01); G06T 5/003 (2013.01); G06T 7/40 (2013.01); G06T 7/90 (2017.01)

(58) Field of Classification Search
None
See application file for complete search history.

(56) References Cited

U.S. PATENT DOCUMENTS

| 5,552,827 A * | 9/1996 | Maenaka | H04N 9/045 348/266 |
| 7,792,384 B2 * | 9/2010 | Gomi | G06T 5/002 382/266 |

(Continued)

FOREIGN PATENT DOCUMENTS

| CN | 101150734 A * | 3/2008 |
| CN | 101197916 A | 6/2008 |

(Continued)

OTHER PUBLICATIONS

CN 101150734 A [Machine translation] (Year: 2008).*
(Continued)

Primary Examiner — Michelle M Entezari
(74) Attorney, Agent, or Firm — WPAT, PC (57) ABSTRACT Disclosed are a color reconstruction device and method capable of accurately recovering the missing color of a target pixel. The device includes: a direction-characteristic estimation circuit calculating a horizontal-variation characteristic and a vertical-variation characteristic according to a first color of a target pixel and the values of pixels within a reference range, in which the target pixel is in the reference range and a current value of the target pixel is a first color value; an edge-texture decision circuit determining which of N predetermined relations matches the relation between the horizontal-variation characteristic and the vertical-variation characteristic and thereby determining the directional characteristic of the target pixel, in which the N is not less than four; and a color recovery circuit calculating a second and a third color values of the target pixel according to the directional characteristic and the values of the pixels within the reference range.

14 Claims, 7 Drawing Sheets (51) Int. Cl.
*G06T 7/90* (2017.01)
*G06T 5/00* (2006.01)

(56) References Cited

U.S. PATENT DOCUMENTS

| | | | | |
|---|---|---|---|---|
| 2006/0124744 | A1* | 6/2006 | Gormish | H04N 19/18 235/462.08 |
| 2009/0010539 | A1* | 1/2009 | Guarnera | G06T 3/4015 382/167 |
| 2011/0317128 | A1* | 12/2011 | Guilloux | G02C 7/025 351/246 |
| 2014/0355872 | A1* | 12/2014 | Shih | G06T 7/90 382/164 |
| 2017/0213326 | A1* | 7/2017 | Kumar | G06T 5/005 |

FOREIGN PATENT DOCUMENTS

| | | |
|---|---|---|
| TW | I274908 | 3/2007 |
| TW | I282519 | 6/2007 |
| TW | 201121305 | 6/2011 |

OTHER PUBLICATIONS

Z. Dengwen et al., "Colour demosaicking with directional filtering and weighting", IET Image Process., 2012, vol. 6, Iss. 8, pp. 1084-1092.

OA letter of the counterpart CN application (appl. No. 201810966328.7) dated Mar. 22, 2021. Summary of the OA letter: Claims 1-10 are rejected as being unpatentable over the cited reference CN101197916A in view of the common techniques of this technical field.

* cited by examiner

Fig. 1

| $G_{1,1}$ | $B_{1,2}$ | $G_{1,3}$ | $B_{1,4}$ | $G_{1,5}$ | $B_{1,6}$ |
| --- | --- | --- | --- | --- | --- |
| $R_{2,1}$ | $G_{2,2}$ | $R_{2,3}$ | $G_{2,4}$ | $R_{2,5}$ | $G_{2,6}$ |
| $G_{3,1}$ | $B_{3,2}$ | $G_{3,3}$ | $B_{3,4}$ | $G_{3,5}$ | $B_{3,6}$ |
| $R_{4,1}$ | $G_{4,2}$ | $R_{4,3}$ | $G_{4,4}$ | $R_{4,5}$ | $G_{4,6}$ |
| $G_{5,1}$ | $B_{5,2}$ | $G_{5,3}$ | $B_{5,4}$ | $G_{5,5}$ | $B_{5,6}$ |
| $R_{6,1}$ | $G_{6,2}$ | $R_{6,3}$ | $G_{6,4}$ | $R_{6,5}$ | $G_{6,6}$ |

S610 — when the type of the directional characteristic relates to the horizontal type, calculating a horizontal high-frequency characteristic value according to the values of the pixels within the reference range, and then updating the first color value of the target pixel according to the first color value of the target pixel and the horizontal high-frequency characteristic value, updating the second color value of the target pixel according to the second color value of the target pixel and the horizontal high-frequency characteristic value, and updating the third color value of the target pixel according to the third color value of the target pixel and the horizontal high-frequency characteristic value S620 — when the type of the directional characteristic relates to the vertical type, calculating a vertical high-frequency characteristic value according to the values of the pixels within the reference range, and then updating the first color value of the target pixel according to the current value of the target pixel and the vertical high-frequency characteristic value, updating the second color value of the target pixel according to the second color value of the target pixel and the vertical high-frequency characteristic value, and updating the third color value of the target pixel according to the third color value of the target pixel and the vertical high-frequency characteristic value

COLOR RECONSTRUCTION DEVICE AND METHOD

BACKGROUND OF THE INVENTION

1. Field of the Invention

The present invention relates to image processing, especial to a color reconstruction device and method.

2. Description of Related Art

A consumer electronic device such as a digital camera, a monitor system, a cell phone, a notebook computer, or a video camera uses a color filter array (CFA) to filter the colors of a captured image for a photosensitive component to record red color (R) information, green color (G) information, and blue color (B) information according to the output of the CFA, in which each pixel position of the photosensitive component merely records the intensity of one color to reduce the production cost; for instance, the first row and the second row of a 2 by 2 (2×2) image pixel array record the intensity of RG (red and green colors) and the intensity of GB (green and blue colors) respectively. In addition, some specific image sensor records the intensity of infrared (IR) or white color (W) to reduce the cost and/or increase the flexibility of application; for instance, the first row and the second row of a 2 by 2 image pixel array record the intensity of RG and the intensity of BIR (blue color and infrared) respectively or record the intensity of RG and the intensity of BW (blue and white colors) respectively. Since each pixel position of the photosensitive component merely records one kind of color information, the lost color information of each pixel position should be recovered by color reconstruction so as to obtain a full color image.

Regarding the design of an image processing IC, since color reconstruction needs to take the color information of the pixels neighboring a target pixel into consideration (e.g., when the red color information of the target pixel is lost and needs to be recovered, the values of pixels which neighbor the target pixel and record red color information are taken into consideration), a large amount of storage space (e.g., a lot of line buffers) is required; additionally, in order to achieve a better effect of color reconstruction, complicated calculation is usually necessary so that the inclination of color intensity variation (which is called "directional characteristic" hereafter) at the position of the target pixel can be determined accurately. Accordingly, color recovery research usually focuses on how to prevent unwanted distortion (e.g., zipper effect on a vertical or horizontal edge, color overlap, Moire pattern, false color, and so on and so forth) caused by an image recovery process in a cost-effective manner. In light of the above, when executing color reconstruction, the directional characteristic plays an important role; more specifically, if the directional characteristic is inaccurate, it will not only lead to distortion, but also affect the sharpness of the output image. In the current arts, the directional characteristic of a pixel is one of the following three characteristics: a horizontal characteristic; a vertical characteristic; and a non-directional characteristic.

Some color reconstruction techniques (which are found in the following literatures: TW patent of patent number "TWI274908B"; TW patent of patent number "TWI282519B"; and TW patent of patent number "TW201121305A") need a lot of divisional calculation and a large amount of storage space, and thus these techniques are hard to be implemented with hardware and not cost-effective.

SUMMARY OF THE INVENTION

An object of the present invention is to provide a color reconstruction device and method capable of recovering the lost color information of a target pixel in an accurate manner.

An embodiment of the color reconstruction device of the present invention includes a direction-characteristic estimation circuit, an edge-texture decision circuit, and a color recovery circuit. The direction-characteristic estimation circuit is configured to calculate a horizontal-variation characteristic value and a vertical-variation characteristic value according to a first color of a target pixel and according to the values of pixels within a reference range, in which the target pixel is in the reference range and a current value of the target pixel is a first color value of the target pixel (i.e., a value of the first color). The edge-texture decision circuit is configured to determine which of predetermined relations matches a relation between the horizontal-variation characteristic value and the vertical-variation characteristic value and thereby determine a directional characteristic of the target pixel. The color recovery circuit is configured to execute at least following steps: when a type of the directional characteristic relates to a horizontal type, calculating a horizontal characteristic value of a second color, a horizontal characteristic value of a third color, a non-directional characteristic value of the second color, and a non-directional characteristic value of the third color according to the values of the pixels within the reference range, and then calculating a second color value of the target pixel (i.e., a value of a second color) according to the horizontal characteristic value of the second color and the non-directional characteristic value of the second color and calculating a third color value of the target pixel (i.e., a value of a third color) according to the horizontal characteristic value of the third color and the non-directional characteristic value of the third color; and when the type of the directional characteristic relates to a vertical type, calculating a vertical characteristic value of the second color, a vertical characteristic value of the third color, the non-directional characteristic value of the second color, and the non-directional characteristic value of the third color according to the values of the pixels within the reference range, and then calculating the second color value of the target pixel according to the vertical characteristic value of the second color and the non-directional characteristic value of the second color and calculating the third color value of the target pixel according to the vertical characteristic value of the third color and the non-directional characteristic value of the third color.

Another embodiment of the color reconstruction device of the present invention includes a direction-characteristic estimation circuit, an edge-texture decision circuit, and a color recovery circuit. The direction-characteristic estimation circuit is configured to calculate a horizontal-variation characteristic value and a vertical-variation characteristic value according to a first color of a target pixel and according to the values of pixels within a reference range, in which the target pixel is in the reference range and a current value of the target pixel is a first color value of the target pixel (i.e., a value of the first color). The edge-texture decision circuit is configured to determine which of N predetermined relations matches a relation between the horizontal-variation characteristic value and the vertical-variation characteristic value and thereby determine a directional characteristic of the target pixel, in which the N is an integer not less than four. The color recovery circuit is configured to calculate a second color value of the target pixel (i.e., a value of a second color) and a third color value of the target pixel (i.e., a value of a third color) according to the directional characteristic and the values of the pixels within the reference range.

A embodiment of the color reconstruction method of the present invention includes the following steps: calculating a horizontal-variation characteristic value and a vertical-variation characteristic value according to a first color of a target pixel and according to the values of pixels within a reference range, in which the target pixel is in the reference range and a current value of the target pixel is a first color value of the target pixel (i.e., a value of the first color); determining which of N predetermined relations matches a relation between the horizontal-variation characteristic value and the vertical-variation characteristic value and thereby determining a directional characteristic of the target pixel, in which the N is an integer not less than four; and calculating a second color value of the target pixel (i.e., a value of a second color) and a third color value of the target pixel (i.e., a value of a third color) according to the directional characteristic and the values of the pixels within the reference range.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The present invention discloses a color reconstruction device and method capable of accurately recovering the lost color information of a target pixel and preventing image distortion.

Figure 1:
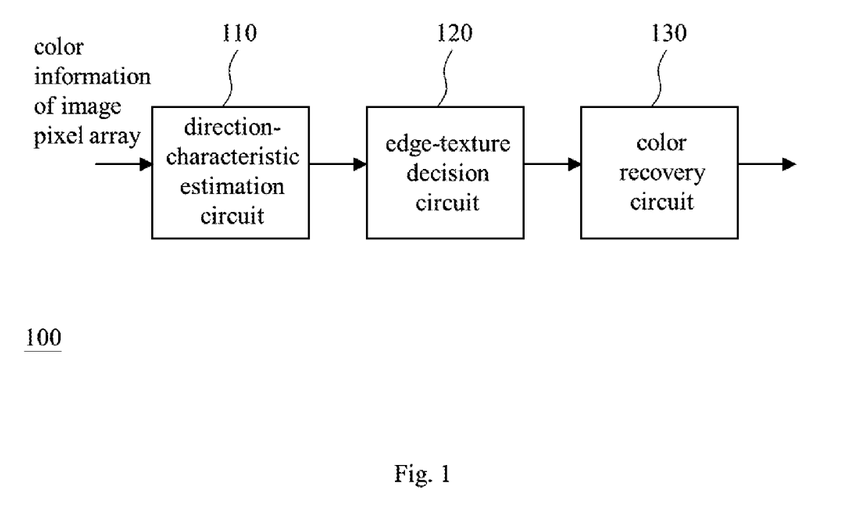
FIG. 1 shows an embodiment of the color reconstruction device of the present invention.
Figure 2:
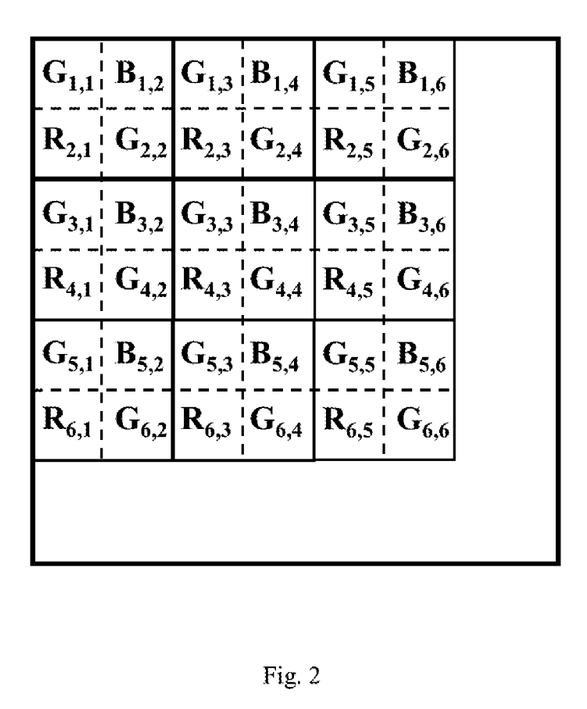
FIG. 2 shows the color information recorded by an exemplary image pixel array.

FIG. 1 shows an embodiment of the color reconstruction device of the present invention. FIG. 2 shows the color information (i.e., the output signal of a color filter array here) recorded by an exemplary image pixel array of a photosensitive component, in which "R", "G", and "B" denote red color information, green color information, and blue color information respectively, and the subscript "i,j" (e.g., "1,1", "1,2", "1,3", etc.) denotes the position of a pixel. In order to prevent the drawing from being complicated, FIG. 2 merely shows a part of color information records. The color reconstruction device 100 of FIG. 1 includes a direction-characteristic estimation circuit 110, an edge-texture decision circuit 120, and a color recovery circuit 130 which are described in detail in the following paragraphs.

Please refer to FIGS. 1-2. The direction-characteristic estimation circuit 110 is configured to receive the color information recorded by an image pixel array (e.g., the image pixel array of FIG. 2) and calculate a horizontal-variation characteristic value $H_C$ and a vertical-variation characteristic value $V_C$ according to a first color of a target pixel and the values of pixels within a reference range, in which the target pixel is in the reference range and a current value of the target pixel is a first color value of the target pixel (i.e., a value of the first color). The calculation of $H_C$ and $V_C$ can be realized with a known or self-developed algorithm such as Discrete Cosine Transform (DCT) calculation, Wavelet Transform calculation, and Gradient calculation that are well-known in this industrial field. For instance, as shown in FIG. 2, the pixels recording green color information is major, and since the green color information is better for the analysis of texture, the green color gradient is suitable for the decision about texture; accordingly, providing the target pixel is a pixel $R_{i,j}$ recording red color information or a pixel $B_{i,j}$ recording blue color information while the reference range is the range of a five by five (5×5) pixel matrix whose center is the position of the target pixel, $H_C$ and $V_C$ of the target pixel can be obtained with the following gradient calculation equations:

$$H_C = \text{abs}(G_{i-2,j-1} - G_{i-2,j+1}) + \text{abs}(G_{i,j-1} - G_{i,j+1}) + \text{abs}(G_{i+2,j-1} - G_{i+2,j+1}) \quad \text{(eq. 1.1)}$$

$$V_C = \text{abs}(G_{i-1,j-2} - G_{i+1,j-2}) + \text{abs}(G_{i-1,j} - G_{i+1,j}) + \text{abs}(G_{i-1,j+2} - G_{i+2,j+2}) \quad \text{(eq. 1.2)}$$

In the above equations, the symbol "abs" denotes the evaluation of an absolute value, "G" denotes a pixel recording green color information, the subscript "i+x,j+y" (e.g., i−2, j−1) denotes the position of a pixel, and "x" and "y" are integers. For another instance, providing the target pixel is a pixel $G_{i,j}$ recording green color information while the reference range is the range of a five by five pixel matrix whose center is the position of the target pixel, $H_C$ and $V_C$ of the target pixel can be obtained with the following gradient calculation equations:

$$H_C = \text{abs}(2 \times G_{i,j} - G_{i,j-2} - G_{i,j+2}) + \text{abs}(2 \times G_{i-2,j} - G_{i-2,j-2} - G_{i-2,j+2}) + \text{abs}(2 \times Gi+2,j - Gi+2,j-2 - Gi+2,j+2) \quad \text{(eq. 1.3)}$$

$$V_C = \text{abs}(2 \times G_{i,j} - G_{i-2,j} - G_{i+2,j}) + \text{abs}(2 \times G_{i,j-2} - G_{i-2,j-2} - G_{i+2,j-2}) + \text{abs}(2 \times Gi,j+2 - Gi-2,j+2 - Gi+2,j+2) \quad \text{(eq. 1.4)}$$

It should be noted that people of ordinary skill in the art can appreciate how to use another algorithm and/or another reference range for the calculation of $H_C$ and $V_C$ in accordance with the present disclosure.

Figure 3:
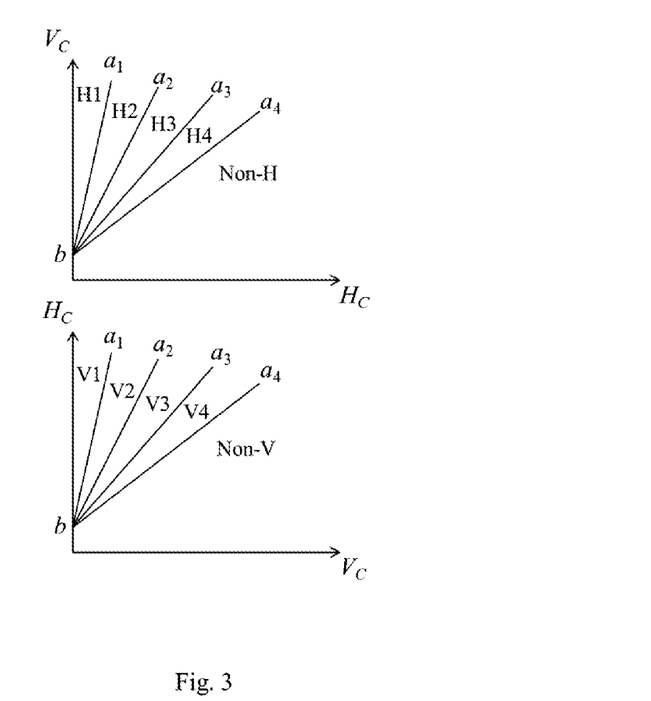
FIG. 3 shows the regions of direction according to an embodiment of the present invention.

Please refer to FIG. 1. The edge-texture decision circuit 120 is configured to determine which of predetermined relations matches the relation between $H_C$ and $V_C$ of the target pixel and thereby determine a directional characteristic of the target pixel, that is to say determining a region of direction into which the texture characteristic of the target pixel falls. For instance, FIG. 3 shows regions of direction while one of the regions is the region the texture characteristic of the target pixel determined according to $H_C$ and $V_C$ may fall into. The regions of direction of FIG. 3 includes the regions of horizontal direction H1, H2, H3, H4, and Non-H (a.k.a. H5) and the regions of vertical direction V1, V2, V3, V4, and Non-V (a.k.a. V5). The edge-texture decision circuit 120 determines whether the texture characteristic of the target pixel falls into any of the regions of X direction ("X" denotes "horizontal" or "vertical") in accordance with $H_C$ and $V_C$ of the target pixel; if the texture characteristic of the target pixel falls into the region Non-D ("D" denotes "H" when "X" denotes "horizontal", or "D" denotes "V" when "X" denotes "vertical"), the edge-texture decision circuit 120 further determines whether the texture characteristic of the target pixel falls into any of the regions of Y direction ("Y" denotes "vertical" or "horizontal" and is distinct from "X"); and if the texture characteristic of the target pixel falls into both of the region Non-H and the region Non-V, the edge-texture decision circuit 120 determines that the directional characteristic of the target pixel is a non-directional characteristic. For another instance, the edge-texture decision circuit 120 determines the region the directional characteristic of the target pixel falls into with the following equation:

$$\begin{cases} \text{Direction} = H1 & \text{if } (1+V_C)/(1+H_C) \geq T_1 \\ \text{Direction} = H2 & \text{if } T_1 > (1+V_C)/(1+H_C) \geq T_2 \\ \text{Direction} = H3 & \text{if } T_2 > (1+V_C)/(1+H_C) \geq T_3 \\ \text{Direction} = H4 & \text{if } T_3 > (1+V_C)/(1+H_C) \geq T_4 \\ \text{Direction} = \text{Non} - H & \text{if } T_4 > (1+V_C)/(1+H_C) \\ \text{Direction} = V1 & \text{if } (1+H_C)/(1+V_C) \geq T_1 \\ \text{Direction} = V2 & \text{if } T_1 > (1+H_C)/(1+V_C) \geq T_2 \\ \text{Direction} = V3 & \text{if } T_2 > (1+H_C)/(1+V_C) \geq T_3 \\ \text{Direction} = V4 & \text{if } T_3 > (1+H_C)/(1+V_C) \geq T_4 \\ \text{Direction} = \text{Non} - V & \text{if } T_4 > (1+H_C)/(1+V_C) \end{cases} \quad (\text{eq. 2.1})$$

In the above equation, "Direction" denotes the directional characteristic of the target pixel, $T_k$ (i.e., $T_1$, $T_2$, $T_3$, or $T_4$ here) is a threshold for determining the scope of a region, and a relation $T_1 > T_2 > \ldots > T_4 > 0$ or another relation between these thresholds is held and can be determined according to the demand for implementation. The equation 2.1 is equivalent to the following equation:

$$\begin{aligned} &\text{Direction} = H1 \ \text{if} \ V_C \geq a_1 \times H_C + b & (\text{eq. 2.2}) \\ &\text{Direction} = H2 \ \text{if} \ a_1 \times H_C + b > V_C \geq a_2 \times H_C + b \\ &\text{Direction} = H3 \ \text{if} \ a_2 \times H_C + b > V_C \geq a_3 \times H_C + b \\ &\text{Direction} = H4 \ \text{if} \ a_3 \times H_C + b > V_C \geq a_4 \times H_C + b \\ &\text{Direction} = \text{Non} - H \ \text{if} \ a_4 \times H_C + b > V_C \\ &\text{Direction} = V1 \ \text{if} \ H_C \geq a_1 \times V_C + b \\ &\text{Direction} = V2 \ \text{if} \ a_1 \times V_C + b > H_C \geq a_2 \times V_C + b \\ &\text{Direction} = V3 \ \text{if} \ a_2 \times V_C + b > H_C \geq a_3 \times V_C + b \\ &\text{Direction} = V4 \ \text{if} \ a_3 \times V_C + b > H_C \geq a_4 \times V_C + b \\ &\text{Direction} = \text{Non} - V \ \text{if} \ a_4 \times V_C + b > H_C \end{aligned}$$

In the above equation, the parameter $a_k$ (i.e., $a_1$, $a_2$, $a_3$, or $a_4$ here) can be understood as the slope of the separation line between two adjacent regions of FIG. 3, a relation $a_1 > a_2 > a_3 > a_4$ is held, and the parameter "b" can be understood as the offset of the separation lines of FIG. 3 in the direction of the vertical axis. It should be noted that by referring to the present disclosure, people of ordinary skill in the art can appreciate how to determine the number of regions of direction and their parameters (e.g., "$T_k$" or "$a_k$" and b") according to the demand for implementation.

Figure 4:
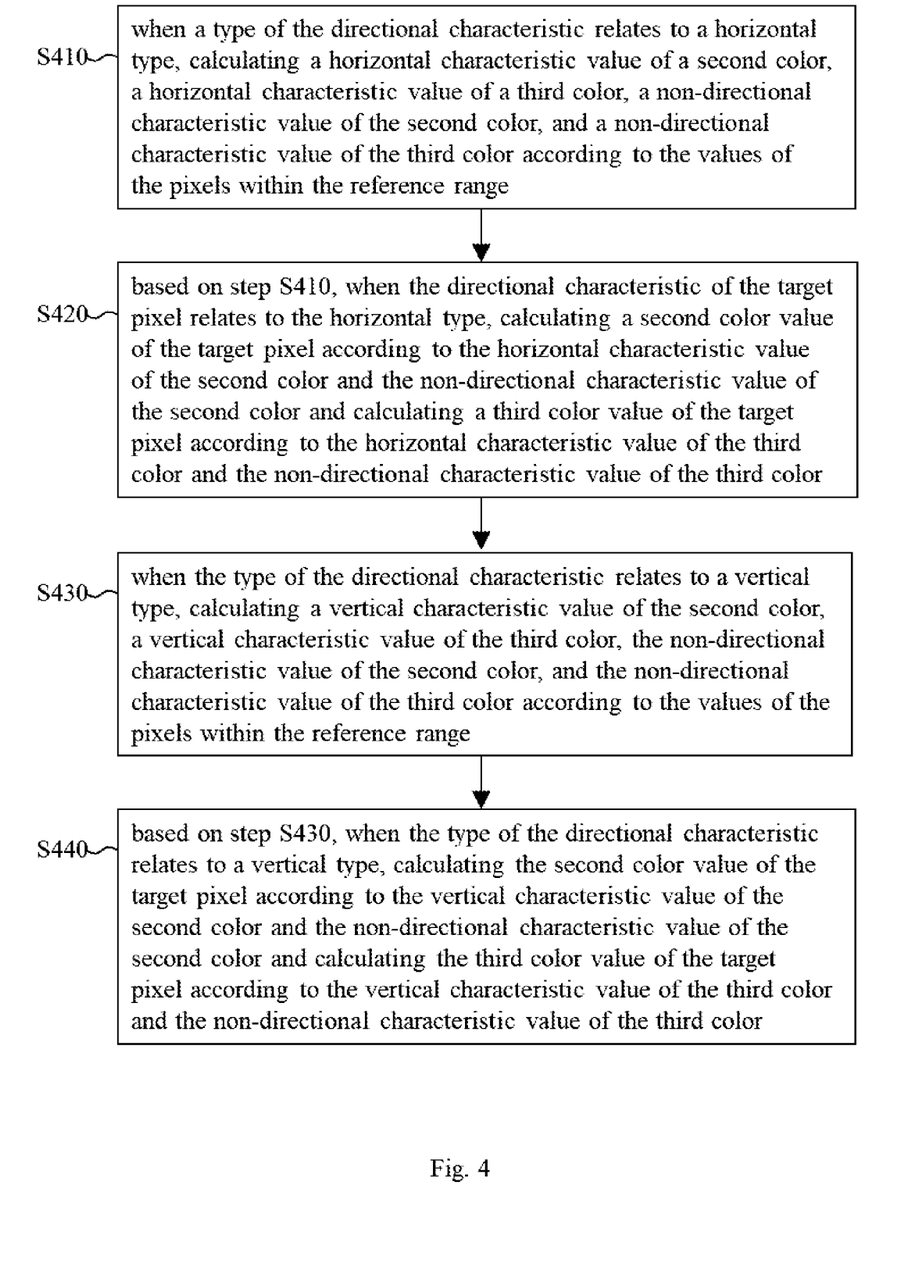
FIG. 4 shows an embodiment of the steps executed by the color recovery circuit of FIG. 1.

Please refer to FIG. 1. After determining the directional characteristic of the target pixel, the color recovery circuit 130 can carry out interpolation (e.g., weighted interpolation) according to the directional characteristic and thereby recover the lost color information of the target pixel. In detail, as shown in FIG. 4, the color recovery circuit is configured to execute the following steps:

Step S410: when a type of the directional characteristic relates to a horizontal type, calculating a horizontal characteristic value of a second color, a horizontal characteristic value of a third color, a non-directional characteristic value of the second color, and a non-directional characteristic value of the third color according to the values of the pixels within the reference range. When the first color of the target pixel is red, which implies that the second color and the third color are green and blue respectively or blue and green respectively, exemplary equations for the calculation of step S410 are shown below:

$$R = R_{i,j} \quad (\text{eq. 3.1})$$
$$G_H = G_{i,j-1} + G_{i,j+1} >> 1$$
$$B_H = \left\{ \begin{array}{l} (B_{i-1,j-1} + B_{i-1,j+1} + B_{i+1,j-1} + B_{i+1,j+1}) + \\ (G_{i,j-1} + G_{i,j+1} - G_{i-1,j} - G_{i+1,j}) \end{array} \right\} >> 2$$

$$R = R_{i,j} \quad (\text{eq. 3.2})$$
$$G_{nd} = G_{i-1,j} + G_{i+1,j} + G_{i,j-1} + G_{i,j+1} >> 2$$
$$B_{nd} = \left\{ \begin{array}{l} (B_{i-1,j-1} + B_{i-1,j+1} + B_{i+1,j-1} + B_{i+1,j+1}) + \\ (G_{i-1,j} + G_{i+1,j} - G_{i,j-1} - G_{i,j+1}) \end{array} \right\} >> 2$$

In the above equations, $R = R_{i,j}$ denotes the first color value of the target pixel, $G_H$ and $B_H$ denotes the horizontal characteristic value of the second color and the horizontal characteristic value of the third color respectively, and $G_{nd}$ and $B_{nd}$ denotes the non-directional characteristic value of the second color and the non-directional characteristic value of the third color respectively. Of course when the first color of the target pixel is blue or green, people of ordinary skill in the art can appreciate how to calculate the horizontal characteristic values of the second and third colors and the non-directional characteristic values of the second and third colors after reading the present disclosure.

Step S420: based on step S410, when the directional characteristic of the target pixel relates to the horizontal type, calculating a second color value (i.e., a value of the second color) of the target pixel according to the horizontal characteristic value of the second color and the non-directional characteristic value of the second color and calculating a third color value (i.e., a value of the third color) of the target pixel according to the horizontal characteristic value of the third color and the non-directional characteristic value of the third color. When the first color of the target pixel is red, exemplary equations for the calculation of step S420 are shown below:

$$R = R_{ij}$$

$$G = \alpha \times G_H + \beta \times G_{nd}$$

$$B = \alpha \times B_H + \beta \times B_{nd}$$

In the above equations, "G" denotes the second color value of the target pixel, "B" denotes the third color value of the target pixel, and the weighted values "α" and "β" can be determined in accordance with the demand for implementation (e.g., the preference for image entropy). An instance of "α" and "β" is shown below:

TABLE 1

| directional characteristic | weighted value | |
| --- | --- | --- |
| | α | β |
| H1 or V1 | 1 | 0 |
| H2 or V2 | $\frac{50}{64}$ | $\frac{14}{64}$ |
| H3 or V3 | $\frac{34}{64}$ | $\frac{30}{64}$ |
| H4 or V4 | $\frac{20}{64}$ | $\frac{44}{64}$ |
| Non-H or Non-V | 0 | 1 |

Step S430: when the type of the directional characteristic relates to a vertical type, calculating a vertical characteristic value of the second color, a vertical characteristic value of the third color, the non-directional characteristic value of the second color, and the non-directional characteristic value of the third color according to the values of the pixels within the reference range. When the first color of the target pixel is red, an exemplary equation for the evaluation of the above-mentioned non-directional characteristic values is the equation 3.2, and an exemplary equation for the evaluation of the above-mentioned vertical characteristic values is shown below:

$$R = R_{i,j} \qquad (eq. 3.3)$$

$$G_V = G_{i-1,j} + G_{i+1,j} >> 1$$

$$B_V = \left\{ \begin{array}{l} (B_{i-1,j-1} + B_{i-1,j+1} + B_{i+1,j-1} + B_{i+1,j+1}) + \\ (G_{i-1,j} + G_{i+1,j} - G_{i,j-1} - G_{i,j+1}) \end{array} \right\} >> 2$$

In the above equation, "$G_V$" and "$B_V$" denote the vertical characteristic value of the second color and the vertical characteristic value of the third color respectively. Of course when the first color of the target pixel is blue or green, people of ordinary skill in the art can appreciate how to calculate the horizontal characteristic values of the second and third colors and the non-directional characteristic values of the second and third colors after reading the present disclosure.

Step S440: based on step S430, when the type of the directional characteristic relates to the vertical type, calculating the second color value of the target pixel according to the vertical characteristic value of the second color and the non-directional characteristic value of the second color and calculating the third color value of the target pixel according to the vertical characteristic value of the third color and the non-directional characteristic value of the third color. When the first color of the target pixel is red, an exemplary equation for the calculation of step S440 is shown below:

$$R = R_{i,j}$$

$$G = \alpha \times G_V + \beta \times G_{nd} \qquad (eq. 3.4)$$

$$B = \alpha \times B_V + \beta \times B_{nd}$$

Figure 5:
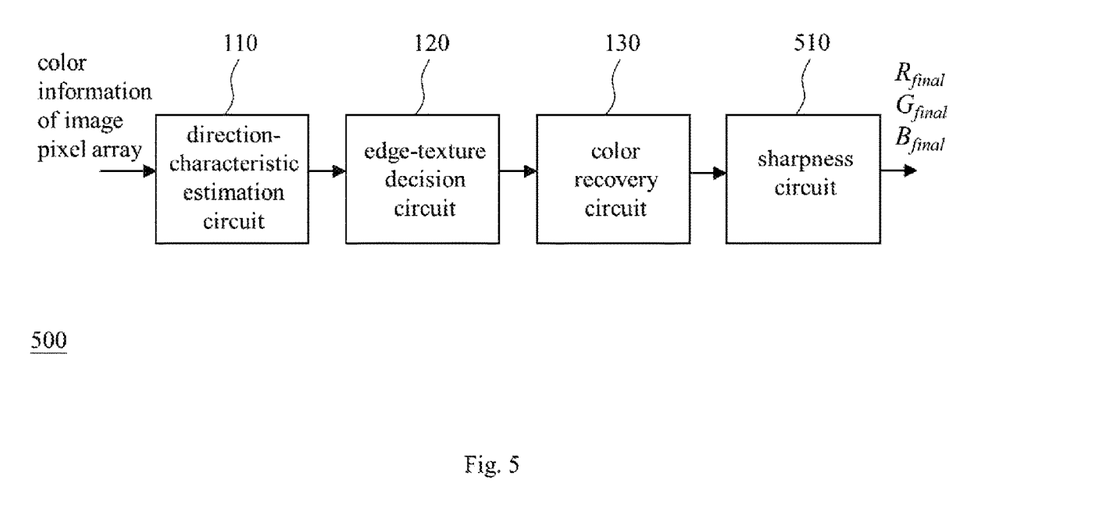
FIG. 5 shows another embodiment of the color reconstruction device of the present invention.
Figure 6:
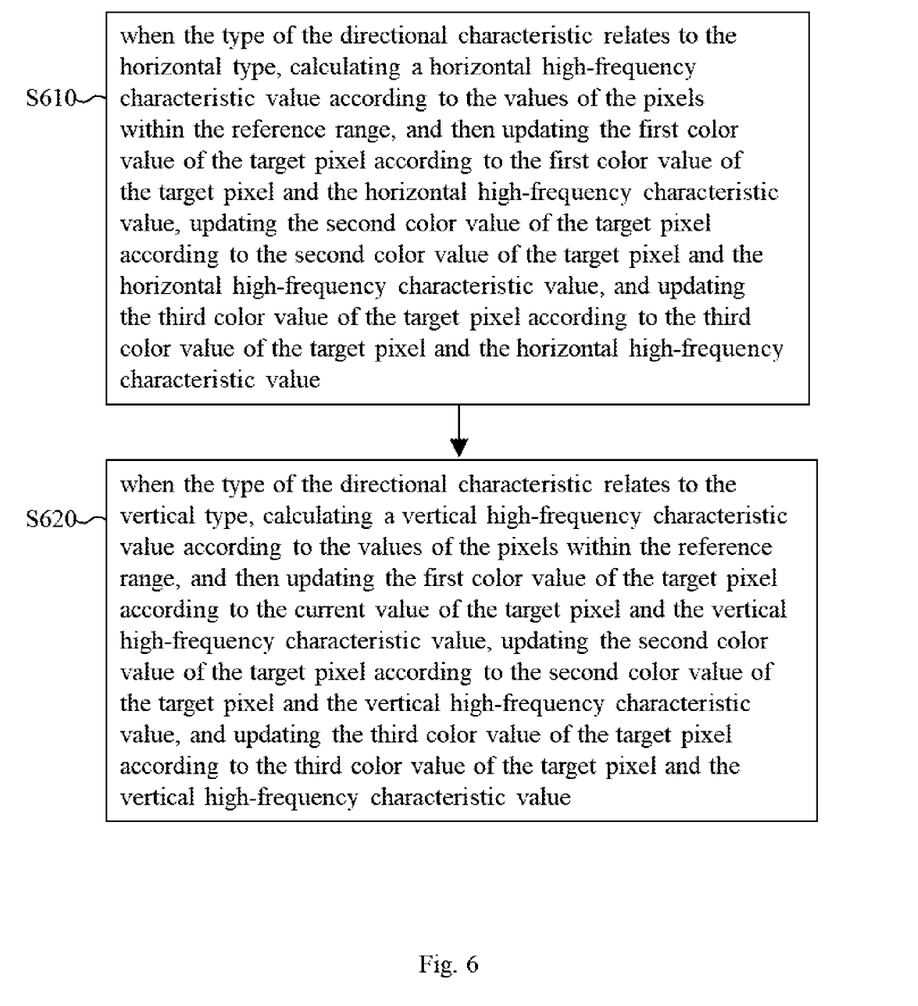
FIG. 6 shows an embodiment of the steps executed by the sharpness circuit of FIG. 5.

In order to enhance the sharpness of the image, the color reconstruction device of the present invention can optionally include a sharpness circuit as shown in FIG. 5. In the color reconstruction device 500 of FIG. 5, the sharpness circuit 510 is configured to execute the following steps as shown in FIG. 6:

Step S610: when the type of the directional characteristic relates to the horizontal type, calculating a horizontal high-frequency characteristic value according to the values of the pixels within the reference range, and then updating the first color value of the target pixel according to the first color value of the target pixel (i.e., the current value of the target pixel here) and the horizontal high-frequency characteristic value, updating the second color value of the target pixel according to the second color value (i.e., the existing second color value here) of the target pixel and the horizontal high-frequency characteristic value, and updating the third color value of the target pixel according to the third color value (i.e., the existing third color value here) of the target pixel and the horizontal high-frequency characteristic value. An instance for the calculation of step S610 is shown below:

$$H_f = \alpha \times H_C + \beta \times N_c \qquad (eq. 4.1)$$

$$\begin{cases} R_{final} = R + H_f \times \gamma_k \\ G_{final} = G + H_f \times \gamma_k \\ B_{final} = B + H_f \times \gamma_k \end{cases} \qquad (eq. 4.2)$$

In the above equations, "$H_f$" denotes the horizontal high-frequency characteristic value, "$N_C$" denotes a non-directional high-frequency characteristic value $$\left( e.g., N_C = \frac{H_C + V_C}{2} \right),$$

"$R_{final}$", "$G_{final}$", and $B_{final}$" denote the updated first, second, and third color values respectively, "$\gamma_k$" denotes a high-frequency parameter for a region Hk (e.g., one of the aforementioned regions H1~H5) and can be determined in accordance with the demand for implementation.

Step S620: when the type of the directional characteristic relates to the vertical type, calculating a vertical high-frequency characteristic value according to the values of the pixels within the reference range, and then updating the first color value of the target pixel according to the current value of the target pixel and the vertical high-frequency characteristic value, updating the second color value of the target pixel according to the second color value (i.e., the existing second color value here) of the target pixel and the vertical high-frequency characteristic value, and updating the third color value of the target pixel according to the third color value (i.e., the existing third color value here) of the target pixel and the vertical high-frequency characteristic value. An exemplary equation for the evaluation of the vertical high-frequency characteristic value $H_f$ is shown below:

$$H_f = \alpha \times V_C + \beta \times N_c \qquad (eq. 4.3)$$

In addition, an exemplary equation for updating each color value of the target pixel is the equation 4.2.

Another embodiment of the color reconstruction device of the present invention includes a direction-characteristic estimation circuit, an edge-texture decision circuit, and a color recovery circuit. The direction-characteristic estimation circuit (e.g., the direction-characteristic estimation circuit 110 of FIG. 1) is configured to calculate a horizontal-variation characteristic value and a vertical-variation characteristic value according to a first color of a target pixel and according to the values of pixels within a reference range, in which the target pixel is in the reference range and a current value of the target pixel is a first color value of the target pixel. The edge-texture decision circuit (e.g., the edge-texture decision circuit 120 of FIG. 1) is configured to determine which of N predetermined relations matches a relation between the horizontal-variation characteristic value and the vertical-variation characteristic value and thereby determine a directional characteristic of the target pixel, in which the N is an integer not less than four. The color recovery circuit (e.g., the color recovery circuit 130 of FIG. 1) is configured to calculate a second color value of the target pixel and a third color value of the target pixel according to the directional characteristic and the values of the pixels within the reference range. An instance of the N predetermined relations includes different horizontal characteristic relations (e.g., the relations associated with the aforementioned H1~H4) and a non-horizontal characteristic relation (e.g., the relation associated with the aforementioned Non-H), and/or includes different vertical characteristic relations (e.g., the relations associated with the aforementioned V1~V4) and a non-vertical characteristic relation (e.g., the relation associated with the aforementioned Non-V). Since those of ordinary skill in the art can appreciate the detail and the modification of this embodiment by referring to the disclosure of the embodiments of FIGS. 1-6, repeated and redundant description is omitted here.

Figure 7:
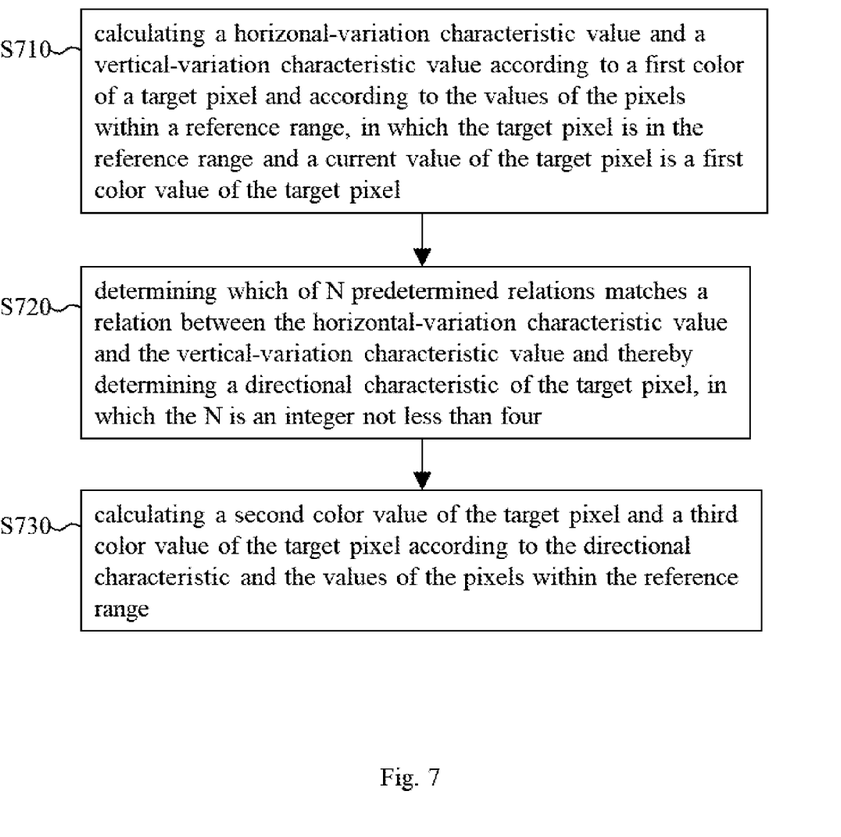
FIG. 7 shows an embodiment of the color reconstruction method of the present invention.

FIG. 7 shows an embodiment of the color reconstruction method of the present invention including the following steps:

Step S710: calculating a horizontal-variation characteristic value and a vertical-variation characteristic value according to a first color of a target pixel and according to the values of pixels within a reference range, in which the target pixel is in the reference range and a current value of the target pixel is a first color value of the target pixel. This step can be carried out by the direction-characteristic estimation circuit 110 of FIG. 1 or the equivalent thereof.

Step S720: determining which of N predetermined relations matches a relation between the horizontal-variation characteristic value and the vertical-variation characteristic value and thereby determining a directional characteristic of the target pixel, in which the N is an integer not less than four. This step can be carried out by the edge-texture decision circuit 120 of FIG. 1 or the equivalent thereof.

Step S730: calculating a second color value of the target pixel and a third color value of the target pixel according to the directional characteristic and the values of the pixels within the reference range. This step can be carried out by the color recovery circuit 130 of FIG. 1 or the equivalent thereof.

Since people of ordinary skill in the art can appreciate the detail and the modification of the method embodiment by referring to the disclosure of the device embodiments, which implies that each feature of the device embodiments can be applied to the method embodiment in a reasonable way, repeated and redundant description is omitted here.

It should be noted that people of ordinary skill in the art can implement the present invention by selectively using some or all of the features of any embodiment in this specification or selectively using some or all of the features of multiple embodiments in this specification as long as such implementation is practicable, which implies that the present invention can be carried out flexibly.

To sum up, the present invention can determine the directional characteristic of a target pixel in a manner more accurate than the prior art and then recover the lost color information of the target pixel accordingly; as a result, the problem of image distortion is relieved.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A color reconstruction device, comprising:
 a direction-characteristic estimation circuit configured to calculate a horizonal-variation characteristic value and a vertical-variation characteristic value according to a first color of a target pixel and according to values of pixels within a reference range, in which the target pixel is in the reference range and a current value of the target pixel is a first color value of the target pixel;
 an edge-texture decision circuit configured to determine which of N predetermined relations matches a relation between the horizontal-variation characteristic value and the vertical-variation characteristic value and thereby determine a directional characteristic of the target pixel, in which the N is an integer not less than four; and
 a color recovery circuit configured to calculate a second color value of the target pixel and a third color value of the target pixel according to the directional characteristic and the values of the pixels within the reference range,
 wherein each of the N predetermined relations is determined by terms including at least one threshold and a ratio of the horizontal-variation characteristic value to the vertical-variation characteristic value.

2. The color reconstruction device of claim 1, further comprising:
 a sharpness circuit configured to update the first color value of the target pixel, the second color value of the target pixel, and the third color value of the target pixel according to the values of the pixels within the reference range, the first color value of the target pixel, the second color value of the target pixel, and the third color value of the target pixel after the color recovery circuit obtains the second color value of the target pixel and the third color value of the target pixel.

3. The color reconstruction device of claim 1, wherein the N predetermined relations include different horizontal characteristic relations and a non-horizontal characteristic relation, and/or include different vertical characteristic relations and a non-vertical characteristic relation.

4. A color reconstruction method, comprising:
 calculating a horizonal-variation characteristic value and a vertical-variation characteristic value according to a first color of a target pixel and according to values of pixels within a reference range, in which the target pixel is in the reference range and a current value of the target pixel is a first color value of the target pixel;
 determining which of N predetermined relations matches a relation between the horizontal-variation characteristic value and the vertical-variation characteristic value and thereby determining a directional characteristic of the target pixel, in which the N is an integer not less than four; and calculating a second color value of the target pixel and a third color value of the target pixel according to the directional characteristic and the values of the pixels within the reference range, wherein each of the N predetermined relations is determined by terms including at least one threshold and a ratio of the horizontal-variation characteristic value to the vertical-variation characteristic value.

5. The color reconstruction method of claim 4, further comprising:

after obtaining the second color value of the target pixel and the third color value of the target pixel, updating the first color value of the target pixel, the second color value of the target pixel, and the third color value of the target pixel according to the values of the pixels within the reference range, the first color value of the target pixel, the second color value of the target pixel, and the third color value of the target pixel.

6. The color reconstruction method of claim 4, wherein the N predetermined relations include different horizontal characteristic relations and a non-horizontal characteristic relation, and/or include different vertical characteristic relations and a non-vertical characteristic relation.

7. The color reconstruction device of claim 1, wherein when a type of the directional characteristic relates to a horizontal type, the color recovery circuit calculates a horizontal characteristic value of a second color, a horizontal characteristic value of a third color, a non-directional characteristic value of the second color, and a non-directional characteristic value of the third color according to the values of the pixels within the reference range, and then calculates a second color value of the target pixel according to the horizontal characteristic value of the second color and the non-directional characteristic value of the second color and calculates a third color value of the target pixel according to the horizontal characteristic value of the third color and the non-directional characteristic value of the third color.

8. The color reconstruction device of claim 1, wherein when a type of the directional characteristic relates to a vertical type, the color recovery circuit calculates a vertical characteristic value of a second color, a vertical characteristic value of a third color, a non-directional characteristic value of the second color, and a non-directional characteristic value of the third color according to the values of the pixels within the reference range, and then calculates a second color value of the target pixel according to the vertical characteristic value of the second color and the non-directional characteristic value of the second color and calculates a third color value of the target pixel according to the vertical characteristic value of the third color and the non-directional characteristic value of the third color.

9. The color reconstruction device of claim 2, wherein when a type of the directional characteristic relates to a horizontal type, the sharpness circuit calculates a horizontal high-frequency characteristic value according to the values of the pixels within the reference range, and then updates the first color value of the target pixel according to the current value of the target pixel and the horizontal high-frequency characteristic value, updates the second color value of the target pixel according to the second color value of the target pixel and the horizontal high-frequency characteristic value, and updates the third color value of the target pixel according to the third color value of the target pixel and the horizontal high-frequency characteristic value.

10. The color reconstruction device of claim 2, wherein when a type of the directional characteristic relates to a vertical type, the sharpness circuit calculates a vertical high-frequency characteristic value according to the values of the pixels within the reference range, and then updates the first color value of the target pixel according to the current value of the target pixel and the vertical high-frequency characteristic value, updates the second color value of the target pixel according to the second color value of the target pixel and the vertical high-frequency characteristic value, and updates the third color value of the target pixel according to the third color value of the target pixel and the vertical high-frequency characteristic value.

11. The color reconstruction method of claim 4, wherein the method further comprises: when a type of the directional characteristic relates to a horizontal type, calculating a horizontal characteristic value of a second color, a horizontal characteristic value of a third color, a non-directional characteristic value of the second color, and a non-directional characteristic value of the third color according to the values of the pixels within the reference range, and then calculating a second color value of the target pixel according to the horizontal characteristic value of the second color and the non-directional characteristic value of the second color and calculating a third color value of the target pixel according to the horizontal characteristic value of the third color and the non-directional characteristic value of the third color.

12. The color reconstruction method of claim 4, wherein the method further comprises: when a type of the directional characteristic relates to a vertical type, calculating a vertical characteristic value of a second color, a vertical characteristic value of a third color, a non-directional characteristic value of the second color, and a non-directional characteristic value of the third color according to the values of the pixels within the reference range, and then calculating a second color value of the target pixel according to the vertical characteristic value of the second color and the non-directional characteristic value of the second color and calculating a third color value of the target pixel according to the vertical characteristic value of the third color and the non-directional characteristic value of the third color.

13. The color reconstruction method of claim 5, wherein the method further comprises: when a type of the directional characteristic relates to a horizontal type, calculating a horizontal high-frequency characteristic value according to the values of the pixels within the reference range, and then updating the first color value of the target pixel according to the current value of the target pixel and the horizontal high-frequency characteristic value, updating the second color value of the target pixel according to the second color value of the target pixel and the horizontal high-frequency characteristic value, and updating the third color value of the target pixel according to the third color value of the target pixel and the horizontal high-frequency characteristic value.

14. The color reconstruction method of claim 5, wherein the method further comprises: when a type of the directional characteristic relates to a vertical type, calculating a vertical high-frequency characteristic value according to the values of the pixels within the reference range, and then updating the first color value of the target pixel according to the current value of the target pixel and the vertical high-frequency characteristic value, updating the second color value of the target pixel according to the second color value of the target pixel and the vertical high-frequency characteristic value, and updating the third color value of the target pixel according to the third color value of the target pixel and the vertical high-frequency characteristic value.

* * * * *